(Model.)
B. F. WHITE.
HARROW OR CLOD CRUSHER.
No. 262,871. Patented Aug. 15, 1882.
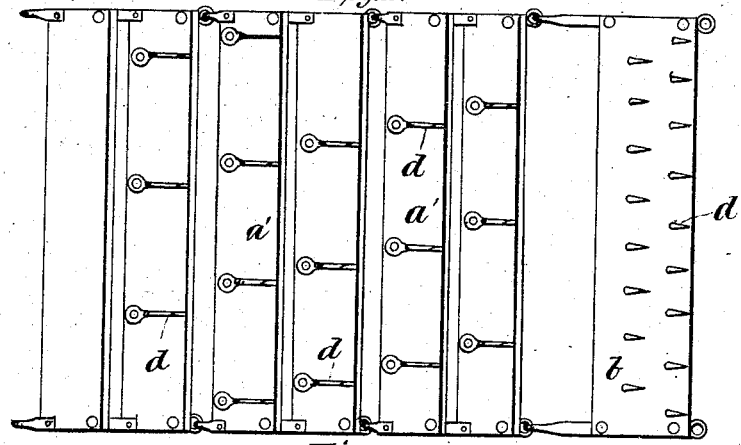
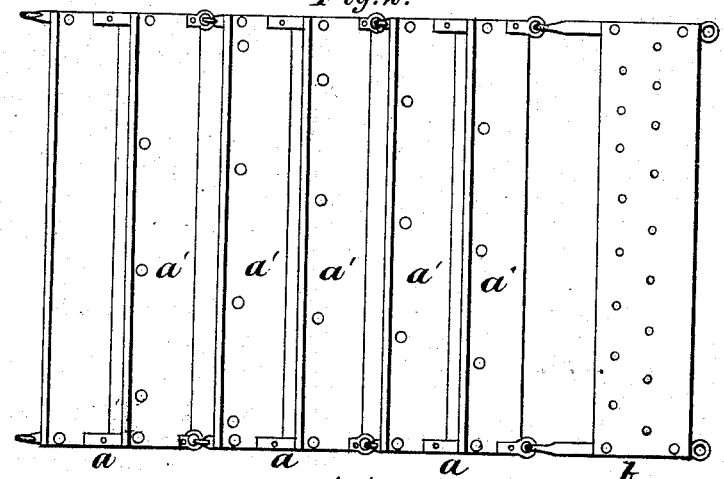
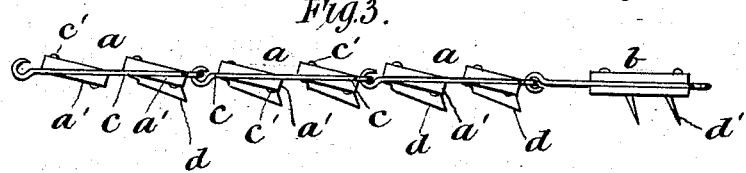
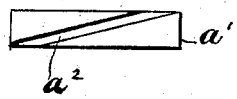
WITNESSES
R. B. Turpin,
T. N. Griffin
INVENTOR
Benjamin F. White
By R. S. & A. P. Lacey,
ATTORNEYS.

UNITED STATES PATENT OFFICE.

BENJAMIN F. WHITE, OF CHAPEL HILL, TENNESSEE, ASSIGNOR TO WILLIAM B. GLENN, OF SAME PLACE.

HARROW OR CLOD-CRUSHER.

SPECIFICATION forming part of Letters Patent No. 262,871, dated August 15, 1882.

Application filed May 10, 1882. (Model.)

*To all whom it may concern:*

Be it known that I, BENJAMIN F. WHITE, a citizen of the United States, residing at Chapel Hill, in the county of Marshall and State of Tennessee, have invented certain new and useful Improvements in Harrows or Clod-Crushers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in harrows or clod-crushers; and it has for its object to furnish a harrow made in sections hinged together, so it will readily adjust itself to inequalities in ground, and in which the toothed bars may be held at an angle, as will be described.

It consists essentially in the combination of the teeth-carrying bars provided in their ends with diagonal slots or mortises, and the connecting-bars placed and secured in these diagonal slots, and provided at their ends with means for coupling one to the other, as will be described.

In the drawings, Figure 1 is an inverted plan, and Fig. 2 is a plan view, of a harrow constructed according to my invention. Fig. 3 is a side view; and in Fig. 4 I show a detail view of the end of one of the harrow-bars.

$a$ $a$ are the main harrowing-sections, and $b$ is the rear or smoothing section. The sections $a$ are composed of the bars $a'$ $a'$. These bars have formed in their opposite ends slots or mortises $a^2$, extended diagonally from the lower corner of the front side to the upper corner of the rear side, as clearly shown in Fig. 4. The bars $a'$ $a'$ are secured together in pairs (forming the sections $a$) by draft or connecting bars $c$, placed in the diagonal slots $a^2$ and secured by bolts $c'$. By this arrangement it will be seen the bars $a'$ are held parallel to each other and at an angle to the surface of the ground, with the lower side of front end of the rear bar in horizontal line with the upper side of rear end of forward bar of the same section, as clearly shown in Fig. 3. The bars $c$, I provide with a hook at one end and an eye at the other, so that the several sections may be readily connected. When the connecting-bars are secured within the slots or mortises $a^2$ and connected together, as shown in Figs. 1 and 2, the bars $c$ will be in a straight line, as shown in Fig. 3, parallel with the surface of the ground, and a direct draft is provided, and at the same time the bars $a'$ are held at an angle to the ground, so that the cut of the knives $d$ will be gradually increasing from front to rear. The rear section, $b$, is composed of a single bar, from the under side of which I project teeth $d'$, and it serves as a smoothing-section.

When it is desired to move my harrow from place to place the several sections may be readily uncoupled. This is also convenient for storing.

It will be understood that the section $b$ may be coupled directly to the forward section of the harrow when it is desired to have a light harrow, or that one of the intermediate sections may be removed and the rear section coupled up, so as to make a shorter harrow, as is often desirable.

I am aware that it is not new to construct a harrow of detachable sections hinged one to the other, and also that harrows have been used in which the toothed bars are held at an angle to the ground-surface; and I do not broadly claim such construction as my invention.

Having thus described my invention, what I claim, and desire to secure by Letters Patent, is—

In a harrow or clod-crusher composed of sections hinged one to the other, the combination of the bars $a'$, constructed with the diagonal slots or mortises $a^2$, and the bars $c$, placed and secured in the slots or mortises $a^2$, and provided at their opposite ends with means for connecting one with the other, substantially as set forth.

In testimony whereof I affix my signature in presence of two witnesses.

BENJAMIN F. WHITE.

Witnesses:
T. H. MORTON,
P. L. MASTIN.